United States Patent
Hudson et al.

(10) Patent No.: US 9,460,046 B1
(45) Date of Patent: Oct. 4, 2016

(54) COMMON COMPUTER HIERARCHAL SYSTEM FOR VIRTUALIZATION OF NETWORK FUNCTION

(71) Applicant: Sprint Communications Company L.P., Overland Park, KS (US)

(72) Inventors: John C. Hudson, Lee's Summit, MO (US); Matthew Hund, Olathe, KS (US); Ching Leuang, Olathe, KS (US); Michael D. Winslow, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 69 days.

(21) Appl. No.: 14/489,467

(22) Filed: Sep. 17, 2014

(51) Int. Cl.
   *G06F 15/16* (2006.01)
   *H04L 29/06* (2006.01)

(52) U.S. Cl.
   CPC ......... *G06F 15/161* (2013.01); *H04L 63/0892* (2013.01)

(58) Field of Classification Search
   CPC ............... H04L 2463/082; H04L 2463/0892; G06F 15/161
   See application file for complete search history.

(56) References Cited

U.S. PATENT DOCUMENTS

| | | | | |
|---|---|---|---|---|
| 2004/0030773 | A1* | 2/2004 | Espinoza-Ibarra ... | G06F 1/3203 709/224 |
| 2005/0076107 | A1* | 4/2005 | Goud ................... | G06F 15/177 709/223 |
| 2006/0031448 | A1* | 2/2006 | Chu ...................... | G06F 9/5061 709/223 |
| 2007/0047195 | A1* | 3/2007 | Merkin .................. | G06F 1/206 361/679.31 |
| 2008/0022148 | A1* | 1/2008 | Barnea ................. | G06F 9/4411 714/5.1 |

* cited by examiner

*Primary Examiner* — Kaveh Abrishamkar
*Assistant Examiner* — Thomas Ho

(57) ABSTRACT

A computer chassis for a telecommunications system, the chassis comprising a first chassis management blade comprising a chassis management application, a plurality of first platform blades, each of the platform blades running a function, the first platform blade functions including at least two of DNS, PCRF, AAA, SAN, DRA, DEG, HSS, NSE, OAP, SDHLR/SMD, SPS functions a plurality of process cards, each process card having a plurality of processors, and wherein the first chassis management application assigns processing requests received from the platform blade functions to one or more of the processors.

17 Claims, 4 Drawing Sheets

COMMON COMPUTER HIERARCHAL SYSTEM FOR VIRTUALIZATION OF NETWORK FUNCTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The evolution of telecommunication computer systems has included the advent of the use of server systems using a chassis and blade arrangement. As currently configured, most such systems comprise one or more chassis, which are large slide-in racks designed to hold a number of electronic cards, also known as blades, the blades coupled to each other on the chassis via a backplane. Traditionally the structure of the system is such that each chassis is related to one specific platform, or one specific application function. For example, a single chassis would be for DNS, one chassis for PCRF, and one chassis for AAA. Each chassis would include at least one platform blade, along with one or more processor blades.

SUMMARY

In an embodiment, a computer chassis for a telecommunications system is disclosed, the chassis comprising a first chassis management blade comprising a chassis management application, a plurality of first platform blades, each of the platform blades running a function, the first platform blade functions including at least two of a Domain Name System (DNS) function, a storage area network (SAN) function, a voice mail function, a media optimization function, a Policy and Charging Rules Function (PCRF), a Authentication, Authorization and Accounting (AAA) security function, a diameter routing agent (DRA) function, a device entitlement gateway (DEG) function, a home subscriber server (HSS) function, a network service enabler (NSE) function, an operational access portal (OAP) function, a super distributed home location register/subscriber data management (SDHLR/SDM) function, and/or a subscriber profile system (SPS) function. The computer chassis further comprises a plurality of process cards, each process card having a plurality of processors, and wherein the first chassis management application assigns processing requests received from the platform blade functions to one or more of the processors.

In another embodiment, a method of running a plurality of communication network functions on a single chassis is disclosed. The method comprises adding a chassis management blade to the single chassis, the chassis management blade running a chassis management application and adding a plurality of platform blades to the single chassis, wherein each platform blade performs a network function and the plurality of platform blades in the single chassis perform two or more network functions selected from a Domain Name System (DNS) function, a storage area network (SAN) function, a voice mail function, a media optimization function, a Policy and Charging Rules Function (PCRF), a Authentication, Authorization and Accounting (AAA) security function, a diameter routing agent (DRA) function, a device entitlement gateway (DEG) function, a home subscriber server (HSS) function, a network service enabler (NSE) function, an operational access portal (OAP) function, a super distributed home location register/subscriber data management (SDHLR/SDM) function, and/or a subscriber profile system (SPS) function. The method further comprises adding a plurality of processor blades to the single chassis, wherein each processor blade comprises at least one processor, coupling the chassis management blade, the plurality of platform blades, and the plurality of processor blades via a backplane, wherein the backplane provides communication between the chassis management blade, the platform blades, and the processor blades without using Layer 2 switches, and having the chassis management application dynamically allocate processing requests from the platform blades to the processors of the processor blades to be processed.

In another embodiment, a method of running a plurality of functions on a single chassis is disclosed, each function running on a separate platform blade, the functions including two or more of a Domain Name System (DNS) function, a storage area network (SAN) function, a voice mail function, a media optimization function, a Policy and Charging Rules Function (PCRF), a Authentication, Authorization and Accounting (AAA) security function, a diameter routing agent (DRA) function, a device entitlement gateway (DEG) function, a home subscriber server (HSS) function, a network service enabler (NSE) function, an operational access portal (OAP) function, a super distributed home location register/subscriber data management (SDHLR/SDM) function, and/or a subscriber profile system (SPS) function, and the processors contained on a plurality of process cards, the method comprising adding the plurality of platform blades and processor blades to the single chassis, adding a chassis management blade to the single chassis, the chassis management blade running a chassis management application, coupling the chassis management blade, the plurality of platform blades, and the plurality of process cards via a backplane, and, assigning processing requests received by the chassis management application from the platform blade functions to one or more of the processors.

In another embodiment, a method of optimizing the performance of a common computer platform is disclosed, the common computer platform comprising a plurality of processors and functions, the functions contained on platform blades, the functions including two or more of a Domain Name System (DNS) function, a storage area network (SAN) function, a voice mail function, a media optimization function, a Policy and Charging Rules Function (PCRF), a Authentication, Authorization and Accounting (AAA) security function, a diameter routing agent (DRA) function, a device entitlement gateway (DEG) function, a home subscriber server (HSS) function, a network service enabler (NSE) function, an operational access portal (OAP) function, a super distributed home location register/subscriber data management (SDHLR/SDM) function, and/or a subscriber profile system (SPS) function, the processors contained on process cards, the method comprising adding the plurality of platform blades and a plurality of processor blades to a single chassis, adding a chassis management blade to the single chassis, the chassis management blade running a chassis management application, coupling the chassis management blade, the plurality of platform blades, and the plurality of process cards via a backplane, and, having the chassis management application control which processors are assigned to which functions based on either anticipated or actual needs of each function.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
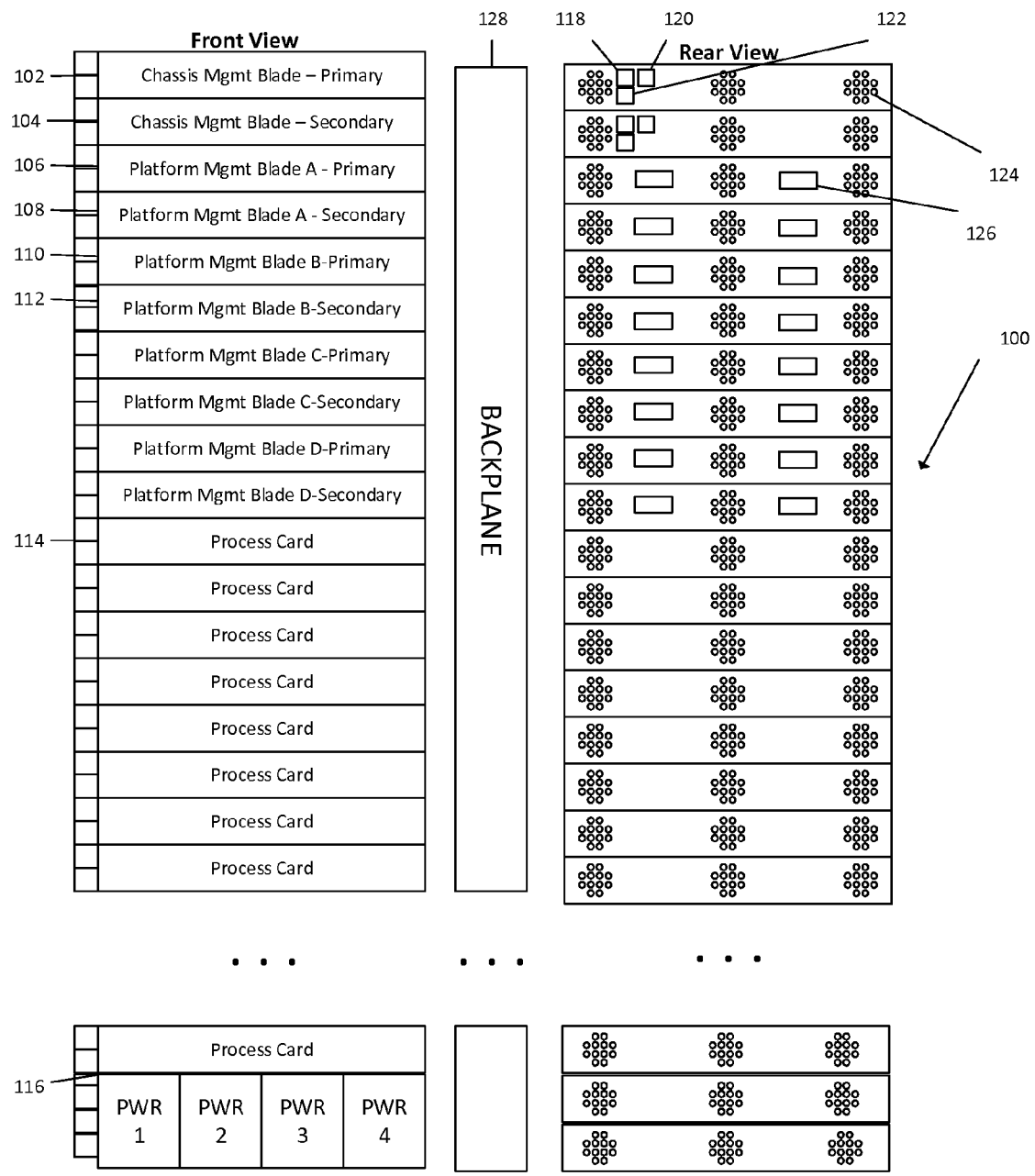
FIG. 1 is an illustration of an apparatus according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Chassis-based common computer platforms have been used for telecommunications networks. Because of the large number of servers required to manage the data serving, routing, and transfer requirements of a telecommunications company, it is useful for a telecommunications company to create techniques which both streamline and economize server utilization. One technique used is the automation of certain functions of a chassis based server systems to facilitate smooth control and interactions between server chassis. It is common for these chassis-based systems to include a number of chassis in a single structure (e.g., an equipment cabinet), each chassis containing one or more platform blades, the blade including a specific function that it implements. Such functions may include Domain Name System (DNS), storage area network (SAN), voice mail, media optimization, Policy and Charging Rules Function (PCRF), Authentication, Authorization and Accounting (AAA) security function, diameter routing agent (DRA) function, device entitlement gateway (DEG) function, home subscriber server (HSS) function, network service enabler (NSE) function, operational access portal (OAP) function, super distributed home location register/subscriber data management (SDHLR/SDM) function, and/or subscriber profile system (SPS) function. The platform blade plugs into the chassis' backplane, along with one or more process cards. These process cards include one or more processors. Traditionally, each chassis executes a single network function.

Previous attempts to virtualize multiple platforms has consisted of adding an additional layer of software over the top, sometimes referred to as a Layer 2 switch, which couples all the various platform chassis with all the various processors. The present disclosure teaches an architecture and/or system between network functions with passing through a Layer 2 switch.

The present disclosure teaches a way to virtualize multiple platforms without an additional layer of software. This is accomplished by having a chassis with at least one chassis management blade to manage the chassis, and then additionally having in the same chassis two or more different platform blades, each of the platform blades performing different network functions. The chassis further comprises a backplane. The chassis management blade, the platform blades, and the process cards connect to the backplane which communicatively couples the blades. The platforms (e.g., the different network functions) are able to communicate with each other via the backplane which obviates the need for additional switching to provide communication between them. The backplane communication may be managed by the chassis management blade. In an embodiment, the instant computer chassis design that deploys multiple platforms in a single chassis may run faster due to avoiding the use of unnecessary switching hardware, thereby creating an improved computer or an improved computer system.

Referring now to FIG. 1, a diagram of a chassis 100 is shown. A primary chassis management blade 102 is coupled to a backplane 128 common to the entire chassis. A "blade," or blade server as it is sometimes referred to, is used in a modular design to minimize the use of physical space and energy, while still retaining all the functional components to be considered a computer. Additionally, a blade server offers the ability of a user to "hot swap" defective or outdated components without an interruption in server functionality. Thus, a blade comprises one or more processors, memory, and one or more applications stored in the memory that, when executed by at least one of the processors, performs some processing associated with the subject application. For example, a chassis management application may be stored in the primary chassis management blade 102 and perform management activities when executed on a processor. Multiple blades are housed in a blade enclosure, and coupled together. Traditionally each blade performs a single function. A "backplane" may be a group of electrical connectors in parallel with each other (e.g., bus bars), so that each pin of each connector is linked to the same relative pin in all the other connectors. The backplane is used as a backbone to couple several blades together.

In FIG. 1, the primary chassis management blade 102 is connected to the backplane 128 by multiple connectors 124 on the back of the blade 102. Also on the back of the primary chassis management blade are primary chassis management blade connectors 118 and 122, to allow the primary chassis management blade to talk with a secondary chassis management blade 104, which has similar connectors. Also on the back of the primary chassis management blade 102 is an input/output port 120, to allow the primary chassis management blade 102 to communication outside the chassis 100. Also on the back is a series of connectors 124 designed to let the primary chassis management blade 102 plug into the backplane 128, and thereby communicate with the other blades plugged into the chassis 100.

In a preferred embodiment, a secondary chassis management blade 104 is also coupled to the backplane 128, to provide back-up to the primary chassis management blade 102. The secondary chassis management blade 104 has on its back connections 118, 120, 122, and 124, similar to those on the primary chassis management blade 102, to perform the same functions. Preferably the chassis management blades 102 and 104 will be synchronized, running identical program instructions and processing identical inputs at the same time, with a periodic parity check between them or with another application to make sure the system is running within its defined operating parameters. If the two inputs suddenly diverge, corrective action may be taken, including for example testing of both blades to determine which is having an issue, and shutting down one while the other continues running, and notifying an operator that a blade needs servicing. In practice, either blade 102 or 104 can be designated as the "primary", and that designation changed to the other blade as needed.

A primary platform management blade A 106 is also coupled to the backplane 128. This platform blade runs one network function, such as DNS, PCRF, AAA, SAN, DRA, DEG, HSS, NSE, OAP, SDHLR/SDM, SPS or another function necessary or useful in the telecommunications industry. On the back of the primary platform management blade A 106 are backplane connectors 124, to allow this blade to couple to the backplane 128 and thereby communicate with the other blades in the chassis 100. Also, on the back of the primary platform management blade A 106 are one or more network connections 126, to allow this blade to communication outside the chassis 100, especially with the network. A secondary platform management blade 108 may also be included to provide back-up to the primary platform management blade 106.

Primary platform management blade B 110 is also attached to the backplane 128. This platform blade 110 runs a different network function from blade 106. So for example, blade 106 may be running DNS while blade 110 runs AAA. Thereby, multiple network functions are running at the same time on a single chassis.

Additional primary platform blades along with their complementary secondary platform blades are shown in FIG. 1. While FIG. 1 includes four platform blades with back-ups, any number of platforms blades may be included, as long as there are at least two different platform blades running different network functions. Each platform blade may have its own operating system and network cabling, to avoid redundancy and cross traffic contamination.

A plurality of process cards 114 are also coupled to the backplane 128. These process cards 114 are blades that connect to the backplane 128 similar to the chassis management and platform blades using connectors 124. Each of the process cards 114 comprise one or more processors, memory, and optionally an application that promotes performing general operations, for example performing any operations that may be delegated to the process card 114 by any of the platform blades. Alternatively, the platform blades may dynamically load and unload applications or segments of applications on a process card 114 that may promote processing delegated to that process card 114 by the subject platform blade. Each process card 114 will preferably contain more than one processor chip. FIG. 1 is shown with a number of process cards, though any number is possible. There are also power connectors 116 coupled to the backplane 128 of the chassis 100, to provide power to all the various blades. As is readily apparent, in an embodiment, the chassis 100 may be constructed with any number of platform and processor blades, e.g., two platform blades and 23 processor blades.

The primary chassis management blade 102 executes software that provides the central control function for the chassis 100, and decides which processors to couple to the various primary platform management blades 106, 110, etc. The primary chassis management blade 102 also preferably executes software that provides the OSS ("Online Service System") connectivity. The primary chassis management blade 102 may also decide when to change the number of processors coupled to each platform management blade based on various inputs. The primary chassis management blade 102 may simply respond to a request from a platform blade for additional processors. The primary chassis management blade 102 may track demand for processing time that each platform blade is requesting. The primary chassis management blade 102 may also alter the number of processors for any particular platform blade based on input from an operator.

The primary chassis management blade 102 may include a demand modeling program that may use input from actual demand for processors over time for all the various functions it controls, thereby creating a time-of-day statistical analysis demand model. For example, in a situation where one function is more highly used in the evening than during the day, the demand model will observe this trend over time, and determine that the primary chassis management blade 102 may automatically assign more processors to the relevant platform blade at a certain time of day. Additionally, the primary chassis management blade 102 may switch some processors to a reduced-power state known as sleep mode (also called idle mode or low power mode) at various times, either due to lack of current demand, or due to an expected lack of demand based on time-of-day statistical analysis. By switching some of the processors to sleep mode some of the time, power and cooling needs of the chassis 100 are reduced. The chassis management application may also assign parameters to the platform functions including one or more of alarms, object management, or Key Performance Indicator metrics.

Figure 2:
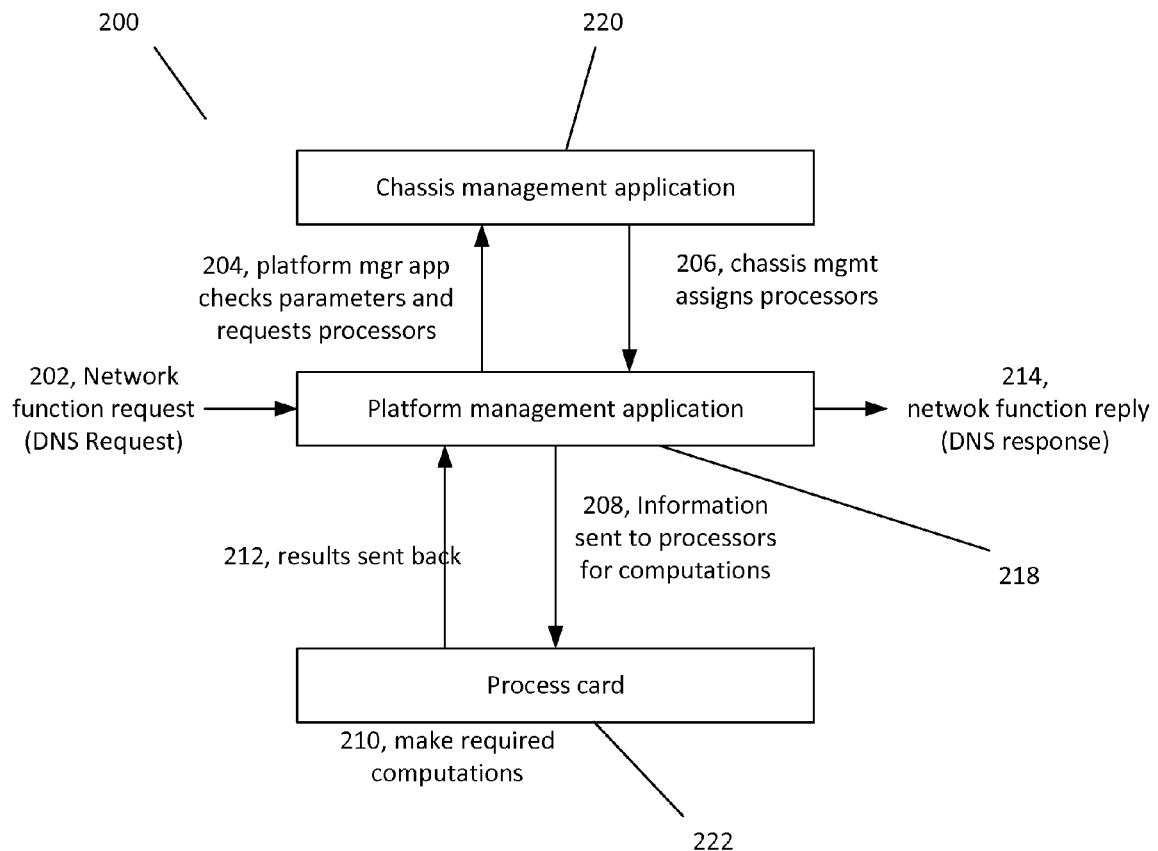
FIG. 2 is a schematic illustrating a method according to an embodiment of the disclosure.

Referring now to FIG. 2, a schematic diagram 200 of a logic flow embodiment is shown. A chassis management application 220 is coupled to platform management application 218 and a process card 222 containing a plurality of processors. Both the chassis management application 220 and the platform management application 218 are each housed on their own blades, each of the blades coupled to a common backplane in a single chassis along with the process card 222. While shown here with a single process card, a preferred embodiment may have a plurality of process cards, thereby giving the chassis management application several processors on several process cards to choose from and to keep track of when assigning them to the various platform management applications.

In operation, a network function request is received 202, such as a DNS request, by the platform management application 218. Each platform management application 218 is responsible for running a particular network function, and in the case illustrated herein, DNS. The platform management application 218 checks the parameters of the request and requests 204 processors. For example, based on trending of DNS requests over a recent time interval, the management application may forecast that it will need more processing power to stay ahead of its work load and respond timely to requests. The chassis management application 220 then assigns 206 processors on the process card 222 to the platform management application 218. The platform management application 218 then sends 208 information to the designated processor for computations. The processor then makes 210 the required computations, and sends the results back 212 to the platform management application 218. The platform management application 218 then sends the network function reply 214. By having each platform management application 218 to request processors through the chassis management application 220, a large number of processors can be in the same chassis with a plurality of platform applications 218, each of the platform applications 218 supporting different network functions, with an appropriate number of processors assigned to each platform application 218 as needed.

Figure 3:
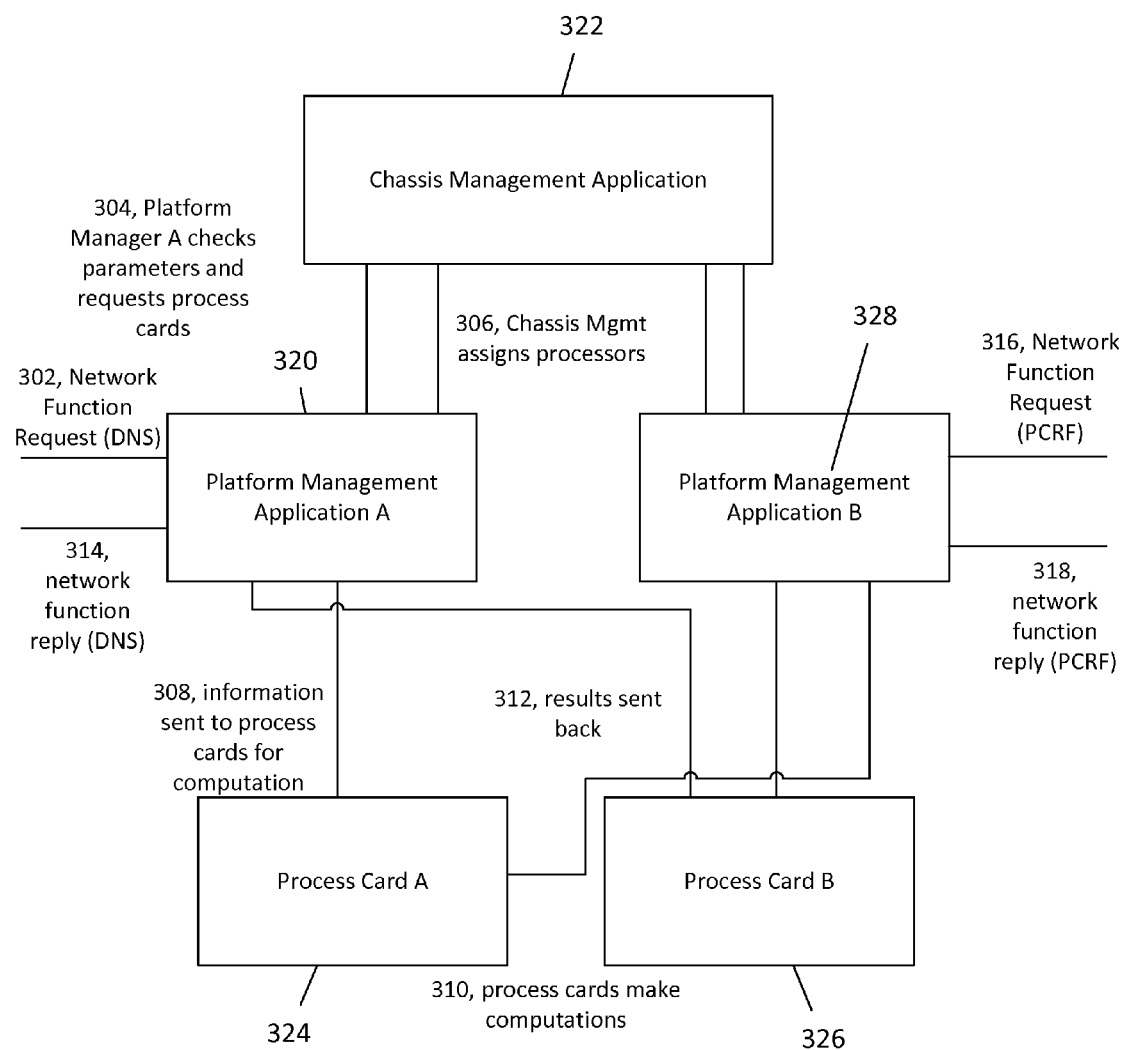
FIG. 3 is a schematic illustrating another method according to an embodiment of the disclosure.

Referring now to FIG. 3, a schematic diagram of another logic flow embodiment of the method is shown. A chassis management application 322 is coupled to platform management application 320, platform management application 328, process card 324 and process card 326. Each of the process cards 324 and 326 contain a plurality of processors. The chassis management application 322 and each of the platform management applications 320 and 328 are housed on their own blades, each of the blades coupled to a common backplane in a single chassis (not shown) along with the process cards 324 and 326. While shown here with two process cards, a preferred embodiment may have more than two process cards, thereby giving the chassis management application several processors on several process cards to choose from and to keep track of.

In operation, a first network function request, here illustrated as a DNS request, comes in 302, to platform management application A 320. The DNS function running on platform management application A 320 checks parameters and requests 304 processors from the chassis management application 322. The chassis management application 322, which is keeping track of which processors are running and which are turned off, which are available, and which are in use by other applications, then replies to the function running on platform management application A 320 and assigns 306 processors, based on availability of processors on process card A 324 and process card B 326 which at 308 information is sent to the process cards for computation at 310. The function running on platform card A 324 then sends the relevant information to the designated processors residing either on process card A 324, process card B 326, or both. The processors then send the results back 312, to the platform management application A 320, which in turn sends a network function reply back out 314 for DNS requests or 318 for PCRF requests.

Similarly, a network function request related to PCRF comes into 316 the appropriate platform management application B 328. The function running on platform management application B 328 would go through a similar series of steps as was undertaken by the DNS request coming into platform management application A 320. The chassis management application 322 would keep track of which processors on the various process cards 324 and 326 are already in use, and assign other processors to the PCRF request. Thereby, both platform management applications 320 and 328 can be running their functions at the same time, in the same chassis, on a common set of processors on a common set of process cards 324 and 326.

Figure 4:
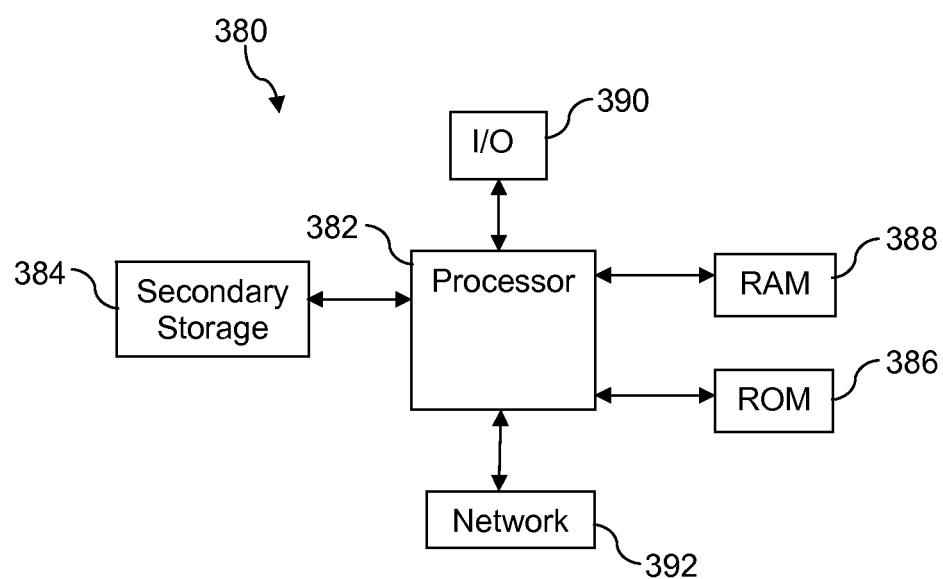
FIG. 4 is an illustration of a computer system according to an embodiment of the disclosure.

Turning now to FIG. 4, a computer system 380 is described. The computer system 380 may be suitable for implementing at least some aspects of the embodiments described above. For example, in an embodiment, the blades and/or the process cards 114 may share at least portions of the architecture and components described with reference to FIG. 4. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of running a plurality of communication network functions on a single chassis, comprising:
    adding a chassis management blade to the single chassis, the chassis management blade running a chassis management application;
    adding a plurality of platform blades to the single chassis, wherein each platform blade performs a network function and the plurality of platform blades in the single chassis perform two or more network functions selected from: a Domain Name System function, a storage area network function, a voice mail function, a media optimization function, a Policy and Charging Rules Function, a Authentication, Authorization and Accounting security function, a diameter routing agent function, a device entitlement gateway function, a home subscriber server function, a network service enabler function, an operational access portal function, a super distributed home location register/subscriber data management function, and a subscriber profile system function;
    adding a plurality of processor blades to the single chassis, wherein each processor blade comprises at least one processor;
    coupling the chassis management blade, the plurality of platform blades, and the plurality of processor blades via a backplane, wherein the backplane provides communication between the chassis management blade, the platform blades, and the processor blades without using a layer 2 switch; and
    having the chassis management application dynamically allocate processing requests from the plurality of platform blades to the processors of the processor blades without routing processing requests through a layer 2 switch prior to the requests being processed.

2. The method of claim 1, wherein the chassis management application contains the Operations Support System connectivity and one or more central control functions.

3. The method of claim 1, further comprising the chassis management application assigning a subset of the processors of the processor blades to one of the platform blades based on a processor demand from the platform blade.

4. The method of claim 1, further comprising shutting down one or more of the processors of the processor blades that are not needed by the platform blades.

5. The method of claim 1, wherein each platform blade has its own operating system and network connection, separate and apart from the other platform blades.

6. The method of claim 1, wherein the chassis management application will assign parameters including one or more of alarms, object management, or Key Performance Indicator metrics.

7. A computer chassis for a telecommunications system, the chassis comprising:
    a first chassis management blade comprising a chassis management application;
    a plurality of first platform blades, each of the platform blades running a different function, the first platform blade functions including at least two: of a Domain Name System function, a storage area network function, a voice mail function, a media optimization function, a Policy and Charging Rules Function, a Authentication, Authorization and Accounting security function, a diameter routing agent function, a device entitlement gateway function, a home subscriber server function, a network service enabler function, an operational access portal function, a super distributed home location register/subscriber data management function, and a subscriber profile system function;
    a plurality of process cards, each process card having a plurality of processors; and
    a backplane communicatively coupled to the first chassis management blade, to the plurality of first platform blades, and to the plurality of process cards,
    wherein the backplane provides communication among the first chassis management blade, the plurality of first platform blades, and the plurality of process cards, and
    wherein the first chassis management application assigns processing requests received from the platform blade functions to at least one of the processors without routing the processing requests through a layer 2 switch.

8. The computer chassis of claim 7, further comprising a second chassis management blade communicatively coupled to the backplane, the second chassis management blade running a second chassis management application, the second chassis management application providing redundancy with the first chassis management application.

9. The computer chassis of claim 8, wherein the secondary chassis management application is synchronized with the first chassis management application.

10. The computer chassis of claim 7, wherein the first chassis management application assigned one or more of the processors to each of the functions.

11. The computer chassis of claim 10, wherein the number of processors assigned to each function varies over time.

12. The computer chassis of claim 7, wherein more than one function may utilize the processors from a single process card.

13. The computer chassis of claim 7, further comprising a plurality of redundant platform blades, so that one redundant platform blade is paired with each first platform blade in the computer chassis.

14. The apparatus of claim 1, wherein the functions performed on the plurality of platform blades perform independently of each other.

15. The method of claim 1, wherein the chassis management application comprises a demand model program that configures a processor of the chassis management blade to determine the anticipated needs of each function.

16. The method of claim 15, wherein the anticipated needs are based at least in part on time-of-day statistical demand data for each function.

17. The method of claim 1, wherein the chassis management application changes the number of processors assigned to the functions based on demand for processors from the functions.

* * * * *